(12) United States Patent
Vassilieva et al.

(10) Patent No.: US 7,991,295 B2
(45) Date of Patent: *Aug. 2, 2011

(54) METHOD AND SYSTEM FOR COMPENSATING FOR OPTICAL DISPERSION IN AN OPTICAL SIGNAL

(75) Inventors: Olga I. Vassilieva, Plano, TX (US); Susumi Kinoshita, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 704 days.

This patent is subject to a terminal disclaimer.

(21) Appl. No.: 12/047,584

(22) Filed: Mar. 13, 2008

(65) Prior Publication Data

US 2009/0074417 A1    Mar. 19, 2009

Related U.S. Application Data

(60) Provisional application No. 60/973,491, filed on Sep. 19, 2007.

(51) Int. Cl.
*H04B 10/12*        (2006.01)
(52) U.S. Cl. ........... 398/147; 398/81; 398/158; 398/159
(58) Field of Classification Search ............ 398/81, 398/147, 148, 149, 158, 159, 183, 192, 193, 398/194, 202, 208, 214, 79
See application file for complete search history.

(56) References Cited

U.S. PATENT DOCUMENTS

| | | | |
|---|---|---|---|
| 7,539,417 B2 * | 5/2009 | Okuno | 398/81 |
| 7,693,425 B2 * | 4/2010 | Vassilieva et al. | 398/147 |
| 2007/0140700 A1 | 6/2007 | Vassilieva et al. | |

OTHER PUBLICATIONS

Furst et al., "Analysis of Crosstalk in Mixed 43 Gb/s RZ-DQPSK and 10.7 Gb/s DWDM Systems at 50 GHz Channel Spacing," 3 pages, 2007 Optical Society of America, 2007.
Gnauck et al., "Spectrally Efficient (0.8 b/s/Hz) 1-Tb/s (25×42.7 Gb/s) RZ-DQPSK Transmission Over 28 100-km SSMF Spans with 7 Optical Add/Drops," 2 pages, 2007.
Charlet et al., "Nonlinear Interactions Between 10Gb/s NRZ Channels and 40Gb/s Channels with RZ-DQPSK or PSBT Format, over Low-Dispersion Fiber," 2 pages, 2006.
Sano et al., "14-Tb/s (140×111-Gb/s [D,/WDM) CSRZ-DQPSK Transmission over 160 km Using 7-THz Bandwidth Extended L-band EDFAs," 2 pages, 2006.
Lefrancois et al., "Cross Comparison of the Nonlinear Impairments Caused by 10Gbit/s Neighboring Channels on a 40Gbit/s Channel Modulated with Various Formats, and Over Various Fiber Types," 2006 Optical Society, 3 pages, 2006.

* cited by examiner

*Primary Examiner* — Hanh Phan
(74) *Attorney, Agent, or Firm* — Baker Botts L.L.P.

(57) ABSTRACT

A method is provided for dispersion compensation of an optical signal communicated in an optical network comprising a plurality of spans of low chromatic dispersion fiber. The method includes receiving an optical signal comprising a plurality of channels, where the information communicated in a first set of one or more of the channels is modulated using a first modulation technique and where the information communicated in a second set of one or more of the channels is modulated using a second modulation technique. The method also includes uniformly undercompensating for optical dispersion in the optical signal across all of the channels of the optical signal such that the accumulated dispersion in the optical signal increases with each span over which the optical signal is communicated. In particular embodiments, all of the channels of the optical signal are uniformly undercompensated in the range of approximately 60% to approximately 85% dispersion compensation for each span.

13 Claims, 3 Drawing Sheets

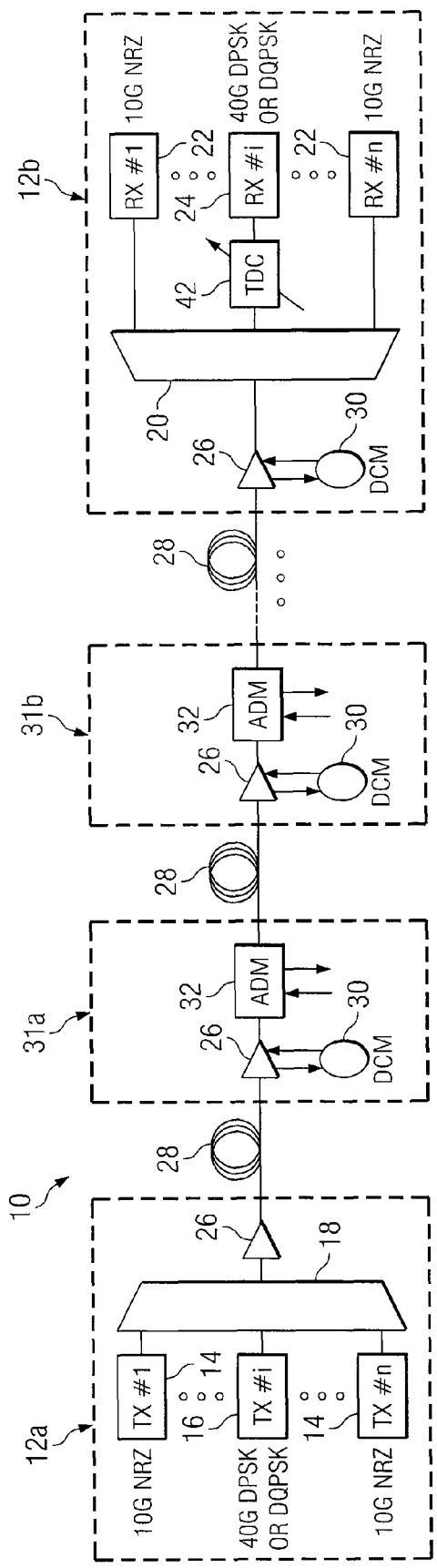
FIG. 1
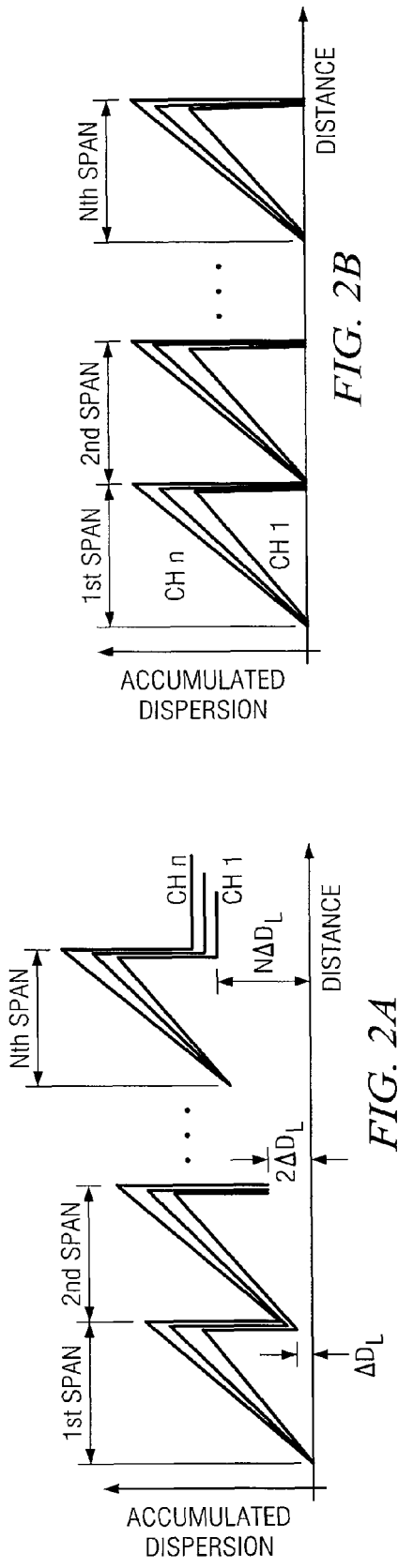
FIG. 2A
FIG. 2B

METHOD AND SYSTEM FOR COMPENSATING FOR OPTICAL DISPERSION IN AN OPTICAL SIGNAL

CROSS REFERENCE TO RELATED APPLICATIONS

This application claims the benefit under 35 U.S.C. §119(e) of U.S. Provisional Application No. 60/973,491, filed Sep. 19, 2007, and entitled "Method and System for Compensating for Optical Dispersion in an Optical Signal."

TECHNICAL FIELD OF THE INVENTION

The present invention relates generally to optical networks and, more particularly, to a method and system for compensating for optical dispersion in an optical signal.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, an often undesirable phenomenon that causes the separation of an optical wave into spectral components with different frequencies. Optical dispersion occurs because the differing wavelengths propagate at differing speeds. The separation of an optical wave into its respective channels due to optical dispersion may require optical dispersion compensation for the particular optical signal.

SUMMARY

In accordance with a particular embodiment of the present invention, a method is provided for dispersion compensation of an optical signal communicated in an optical network comprising a plurality of spans of low chromatic dispersion fiber. The method includes receiving an optical signal comprising a plurality of channels, where the information communicated in a first set of one or more of the channels is modulated using a first modulation technique and where the information communicated in a second set of one or more of the channels is modulated using a second modulation technique. The method also includes uniformly undercompensating for optical dispersion in the optical signal across all of the channels of the optical signal such that the accumulated dispersion in the optical signal increases with each span over which the optical signal is communicated. In particular embodiments, all of the channels of the optical signal are uniformly undercompensated in the range of approximately 60% to approximately 85% dispersion compensation for each span.

Technical advantages of one or more embodiments of the present invention may also include increasing signal performance across the network by performing optical dispersion undercompensation uniformly across all of the differently-modulated channels in a signal communicated over low chromatic dispersion fiber. Performing undercompensation across all channels may, optimally or near-optimally, reduce interchannel effects in a signal. Reducing interchannel effects may increase the performance of the signal.

Embodiments of the present invention may also allow for an economically efficient system and method for performing optical dispersion compensation on optical signals comprised of channels with different modulation formats. One or more of the embodiments of the present invention may include system components currently in use in optical networks or allow for economically efficient upgrades of or additions to currently used components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of an optical network carrying a signal comprising a plurality of sets of channels using at least two different modulation formats;

FIGS. 2A and 2B are graphs illustrating the difference in optimum optical dispersion compensation for the sets of channels of FIG. 1;

DETAILED DESCRIPTION

Figure 3:
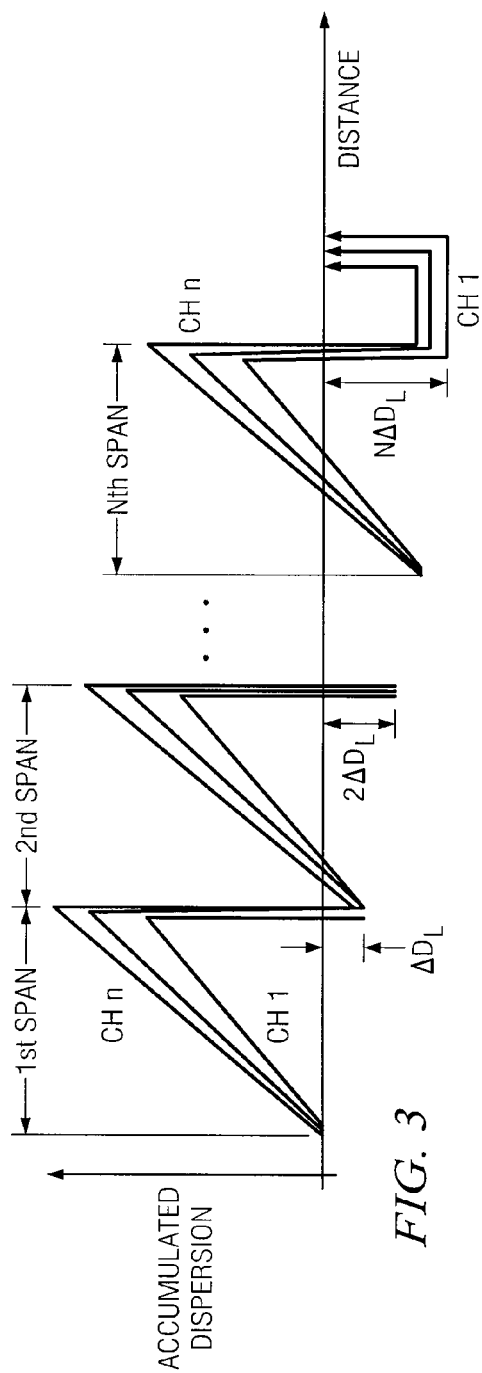
FIG. 3 is a graph illustrating optical dispersion overcompensation for signals in the optical network of FIG. 1.

FIG. 1 illustrates an example optical network 10. The optical network 10 includes one or more optical fibers 28 operable to transport one or more optical signals communicated by components of the optical network 10. The components of optical network 10, coupled together by the optical fibers 28, include terminal nodes 12a and 12b and one or more optical add/drop multiplexers (OADM) 31 (for example, OADMs 31a and 31b). Although the optical network 10 is shown as a point-to-point optical network with terminal nodes, the optical network 10 may also be configured as a ring optical network, a mesh optical network, or any other suitable optical network or combination of optical networks. The optical network 10 may be used in a short-haul metropolitan network, a long-haul inter-city network, or any other suitable network or combination of networks.

Terminal node 12a includes transmitters 14 and 16, a multiplexer 18, and an amplifier 26. Transmitters 14 and 16 include any transmitter or other suitable device operable to transmit optical signals. Each transmitter 14 or 16 is operable to receive information and to modulate one or more wavelengths of light to encode the information on the wavelength. In optical networking, a wavelength of light is also referred to as a channel. Each transmitter 14 or 16 is also operable to transmit this optically encoded information on the associated wavelength. The multiplexer 18 includes any multiplexer or combination of multiplexers or other devices operable to combine different channels into one signal. Multiplexer 18 is operable to receive and combine the disparate channels transmitted by transmitters 14 and 16 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy is applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, the terminal node 12a in optical network 10 is operable to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (Gb/s) and modulate the optical signal using, for example, a non-return-to-zero (NRZ) modulation technique. Signal transmission upgrades include, for example, transmitting information at forty Gb/s using differential phase shift keying (DPSK) or differential quadrature phase shift keying (DQPSK) to modulate the optical signal. Since upgrading the entire optical network's transmitters would be cost-prohibitive for most optical network operators, many such operators have instead desired to upgrade their networks by incrementally replacing existing ten Gb/s NRZ transmitters with forty Gb/s DPSK or DQPSK transmitters (these types of transmitters being used only as examples).

One challenge faced by those wishing to implement the cost-efficient strategy of integrating upgraded transmitters with existing transmitters is the challenge of optical dispersion compensation. Even in existing WDM and DWDM networks, optical signals comprised of disparate wavelengths experience optical dispersion. Optical dispersion refers to the separation of an optical signal into its spectral components with different frequencies. Optical dispersion occurs because the differing wavelengths propagate at differing speeds. As optical signals travel across existing optical networks and experience optical dispersion, they may receive appropriate optical dispersion compensation to achieve at least adequate performance. Specially designed dispersion compensation fibers have been developed to compensate for dispersion in an optical signal comprised of channels modulated using the same modulation technique.

Systems that employ both upgraded transmitters and existing transmitters need to perform optical dispersion compensation on channels that use different modulation techniques. The challenge that arises is that optimal optical dispersion compensation for channels using different modulation techniques may be different. For example, this is in fact the case with channels modulated using NRZ modulation and channels modulated using DPSK, DQPSK or any other suitable phase shift keying modulation technique (referred to generally herein as nPSK), as illustrated in FIGS. 2A and 2B.

As discussed above, the graphs in FIGS. 2A and 2B illustrate the difference in optimal optical dispersion compensation for two different WDM optical signals, a ten Gb/s NRZ signal and a forty Gb/s nPSK signal. The vertical axis of the graphs represents accumulated optical dispersion. The horizontal axis of the graphs represents the distance that the optical signal has traveled (the number of optical fiber spans over which the signal has traveled). $\Delta D_L$ refers to the residual optical dispersion that a signal should exhibit after each span for optimum performance.

FIG. 2A illustrates an optical dispersion map for a signal comprising a set of ten Gb/s NRZ channels that would optimize performance for that signal. As illustrated in FIG. 2A, the ten Gb/s NRZ channels have optimum performance when they are undercompensated. In other words, performing optical dispersion compensation in the optical signal after each span so that the optical signal exhibits a positive $\Delta D_L$ per span leads to optimal performance for the ten Gb/s NRZ channels.

As illustrated in FIG. 2B, a signal comprising a set of forty Gb/s nPSK channels has optimum performance when the channels undergo 100% compensation. In other words, performing optical dispersion compensation on the optical signal after each span so that the optical signal exhibits a zero $\Delta D_L$ per span leads to optimal performance for the forty Gb/s nPSK channels.

As illustrated in FIGS. 2A and 2B, theoretically optimal or near-optimal optical dispersion compensation is different for channels using an NRZ modulation format than for channels using a nPSK modulation format. In existing networks, optical dispersion compensation devices perform optical dispersion compensation on signals using one modulation format, such as the NRZ format. If upgraded transmitters using a different modulation format, such as the nPSK format, are incorporated into the network alongside existing NRZ transmitters, the existing optical dispersion compensation devices will not perform appropriate optical dispersion compensation for the upgraded optical signals. Embodiments of the present invention, discussed below, address the challenge of providing sufficient optical dispersion compensation in signals carrying channels using different modulation formats.

Referring back to the example embodiment in FIG. 1, the WDM signal generated by node 12a includes sets of channels using different modulation formats. In particular, the WDM signal comprises a set of channels communicating information at ten Gb/s using NRZ modulation and a set of channels communicating information at forty Gb/s using nPSK modulation; however, the sets of disparate channels may communicate information at any suitable bit rate and/or using any suitable modulation technique. For example, one or more of the channels may communicate information at a rate of ten, twenty, forty, eighty, over eighty Gb/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel signal is transmitted from terminal node 12a, the signal travels over optical fibers 28 to OADMs 31. The optical fibers 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10. Furthermore, as is discussed in more detail below, the fibers 28 may be high chromatic dispersion fibers (as an example only, standard single mode fiber (SSMF) or non-dispersion shifted fiber (NDSF)), low chromatic dispersion fibers (as an example only, non zero-dispersion-shifted fiber (NZ-DSF), such as E-LEAF fiber), or any other suitable fiber types. According to particular embodiments, different types of fiber 28 create the need for different dispersion compensation schemes to be applied to the signals, as discussed in further detail below.

OADMs 31 include an amplifier 26 and associated optical dispersion compensating module 30 (DCM), as well as an add/drop module 32 (ADM). As discussed above, amplifiers 26 may be used to amplify the WDM signal as it travels through the optical network 10. ADMs 32 may include any device or combination of devices operable to add and/or drop optical signals from fibers 28, as are well-known in the art. DCMs 30 include any dispersion compensating fiber (DCF), tunable dispersion compensator (TDC), variable dispersion compensator (VDC) or other dispersion compensating device operable to perform optical dispersion compensation on a signal or set of channels comprising a signal using one or more modulation techniques. Although the optical network 10 shows the DCMs 30 coupled to respective amplifiers 26, the DCMs 30 may also be positioned separately from the amplifiers 26.

In previous U.S. patent application Ser. No. 11/311,717, the applicants disclosed a scheme by which each set of differently-modulated channels in a signal (e.g., NZ vs. nPSK) was compensated differently so as to produce a different dispersion compensation scheme for signals having different modulation. However, example network 10 of FIG. 1 applies the same dispersion compensation to all channels in the optical signal, regardless of which modulation technique is being used.

In example network 10, where all channels in a signal receive the same dispersion compensation as the signal travels across the network, the amount of dispersion compensation applied to each channel may be chosen to reduce inter-channel effects in the signal such as cross-phase modulation (XPM). In network 10, the compensation required to reduce inter-channel effects may depend on the sets of differently-modulated signals being carried by a signal and depend on the type of fiber being used.

For example and without limitation, in a signal carrying two sets of channels, ten Gb/s NRZ channels and forty Gb/s nPSK channels, respectively, over high chromatic dispersion fiber, experiments have shown that performing uniform undercompensation on these signals or compensating these signals so that all channels exhibit zero dispersion may not reduce inter-channel effects optimally or near-optimally. Instead, applying uniform overcompensation (between approximately 110% and 115% overcompensation in some tests) to all channels has been shown to effectively reduced inter-channel effects. It should be noted, however, that signals carrying different sets of differently-modulated channels may require different dispersion compensation to reduce inter-channel effects optimally or near-optimally.

In light of these findings, particular embodiments of example network 10 implementing high chromatic dispersion fiber, such as SSMF or NDSF fiber, perform uniform dispersion overcompensation on signals comprising ten Gb/s NRZ and forty Gb/s nPSK channels as these signals travel across the network. In particular embodiments, a signal comprising ten Gb/s NRZ and forty Gb/s nPSK channels may receive, for example, between approximately 110% and 115% overcompensation at DCMs 30. FIG. 3, described in more detail below, illustrates one such overcompensation scheme. It should be noted that certain channels in these signals may receive additional compensation if and when they are dropped at an OADM 31 or are received at terminal node 12b to provide optimal or near-optimal dispersion compensation for the particular data rate and/or modulation format of the channel as described below.

After a signal passes through an OADM 31, the signal may travel along fibers 28 directly to terminal node 12b, or the signal may be passed through one or more additional OADMs 31 (such as OADM 31b, for example) before reaching terminal node 12b (the terminal node might also be an OADM, such as in a ring network). Terminal node 12b is operable to receive signals transmitted over optical network 10. Terminal node 12b includes an amplifier 26 and an associated DCM 30, a demultiplexer 20, and receivers 22 and 24. As described above, amplifier 26 may be used to amplify the WDM signal as it travels through the optical network 10, and DCM 30 may perform optical dispersion compensation on the signal as described above. Again, although the optical network 10 shows DCM 30 coupled to a respective amplifier 26, the DCM 30 may also be positioned separately from amplifier 26.

Demultiplexer 20 includes any demultiplexer or other device operable to separate the disparate channels multiplexed using WDM, DWDM, or other suitable multi-channel multiplexing technique. Demultiplexer 20 is operable to receive an optical signal carrying a plurality of multiplexed channels, demultiplex the disparate channels in the optical signal, and pass the disparate channels to different receivers 22 and 24.

Receivers 22 and 24 include any receiver or other suitable device operable to receive an optical signal. Each receiver 22 or 24 is operable to receive a channel of an optical signal carrying encoded information and demodulate the information into an electrical signal. These channels received by receivers 22 or 24 may include the channels transmitted by transmitters 14 and 16 and/or channels added by ADMs 32. In addition, the forty Gb/s nPSK channels (and/or any other suitable channels) may be additionally compensated at terminal node 12b using, for example, tunable dispersion compensators 42 associated with receivers 24.

In operation, transmitters 14 and 16 of terminal node 12a transmit information at different bit rates and/or using different modulation techniques over different channels. The multiplexer 18 combines these different channels into an optical signal and communicates the signal over optical fiber 28, which in this example is high chromatic dispersion fiber. An amplifier 26 receives the optical signal, amplifies the signal, and passes the signal over optical fiber 28. Optical fiber 28 transports the signal to an OADM 31a. Amplifier 26 of OADM 31a receives the signal, amplifies the signal, and passes the signal to the DCM 30 of OADM 31a. Again, amplifier 26 of OADM 31a may be positioned separately from, either before or after, the DCM 30.

The DCM 30 of OADM 31a receives the signal and performs optical dispersion compensation on the signal. The signal may be overcompensated any suitable amount to enhance the performance of the signal. This amount may include, for example and without limitation, between approximately 110% and 115% overcompensation at each DCM 30. After the DCM 30 performs optical dispersion compensation on the signal and forwards the signal, the ADM 32 of OADM 31a receives the signal. After receiving the optical signal, the ADM 32 may drop channels from the optical signal and/or add channels to the optical signal.

After the signal passes through the one or more OADMs 31 (such as, for example, OADMs 31a and 31b), DCM 30 of terminal node 12b receives the forwarded signal and performs optical dispersion compensation on the signal. The demultiplexer 20 of terminal node 12b receives the signal, demultiplexes the signal into the signal's constituent channels, and passes the signal's constituent channels. Each channel is received by an associated receiver 22 or 24 of terminal node 12b and forwarded. In particular embodiments, complete optical dispersion compensation (approximately 100% compensation) may be performed on the forty Gb/s NPSK channels at terminal node 120b using a TDC 42 or other dispersion compensating device, as described above.

As noted above, although the optical network 10 is shown as a point-to-point optical network with terminal nodes, the optical network 10 may also be configured as a ring optical network, a mesh optical network, or any other suitable optical network or combination of optical networks.

It should be noted that although particular components have been shown, modifications, additions, or omissions may be made to the optical network 10 without departing from the scope of the invention. The components of the optical network 10 may be integrated or separated according to particular needs. Moreover, the operations of the optical network 10 may be performed by more, fewer, or other components.

FIG. 3 is a graph illustrating optical dispersion overcompensation for signals in the optical network of FIG. 1. Specifically, the graph illustrates the optical dispersion overcompensation performed by DCMs 30 of optical network 10. Such a scheme may be appropriate when fibers 28 of the network are high chromatic dispersion fibers. The vertical axis represents accumulated optical dispersion. The horizontal axis represents the distance that the optical signal has traveled (the number of optical fiber spans over which the signal has traveled). $\Delta D_L$ refers to the residual optical dispersion that a signal in an example embodiment exhibits after each span for optimum (or near-optimum) performance.

In the particular embodiment illustrated, each DCM 30 overcompensates for dispersion in an amount greater than the dispersion accumulated over the span of fiber 28 by $\Delta D_L$. Thus, after the first span over which the signal has traveled, DCM 30 will compensate the signal such that accumulated dispersion is equal to $\Delta D_L$. Over N spans, accumulated dispersion is equal to $N(\Delta D_L)$. In particular embodiments, as described above, before being received by receivers 24 of terminal node 12b, the forty Gb/s nPSK signals may be compensated by additional dispersion compensation devices such as, for example, additional TDCs. FIG. 3 illustrates how, in particular embodiments, additional dispersion compensation is applied by these devices on the forty Gb/s nPSK signals such that these signal comprise zero accumulated optical dispersion. The ten Gb/s NRZ signals may not need any additional compensation before being received by receivers 22.

Although the overcompensation scheme described above in conjunction with the use of high chromatic dispersion fiber in the network 10 of FIG. 1 is suited for use with such fiber, this overcompensation scheme is not optimal when fiber 28 of network 10 is low chromatic dispersion fiber (such as E-LEAF fiber). For example, the XPM can be more significant in low chromatic dispersion fiber than with high chromatic dispersion fiber. Therefore, a different compensation scheme is needed for such low chromatic dispersion fiber, as described below.

Figure 4:
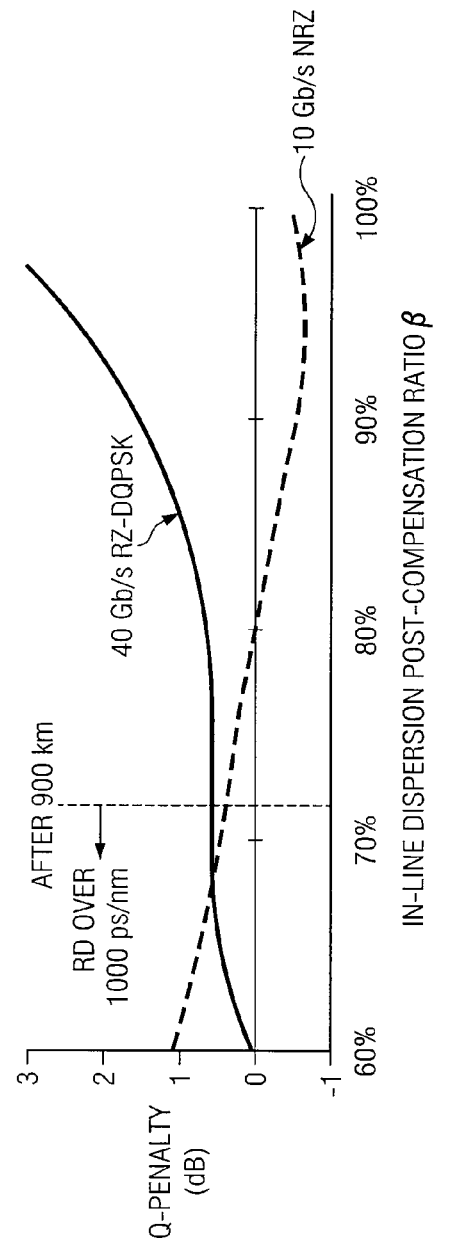
FIG. 4 is a graph illustrating the Q-penalty as a function of the amount of in-line compensation applied to co-propogating signals in low chromatic dispersion fiber.

FIG. 4 is a graph illustrating the Q-penalty (eye penalty) at an optical signal-to-noise ratio of 17 dB as a function of the amount of in-line compensation ($\beta$) applied to a ten Gb/s NRZ signal and a forty Gb/s RZ-DQPSK optical signal for the particular example simulation parameters shown in Table 1.

TABLE 1

Simulation Parameters

| | |
|---|---|
| Bit rate | 43.02 Gb/s, 11.1 Gb/s |
| Chromatic dispersion | 3.83 ps/nm/km @ 1545 nm |
| Dispersion slope | 0.084 ps/nm2/km @ 1545 nm |
| Transmission distance | 450, 900, and 1350 km (75 km × 6, 12, and 18) |
| Fiber launch power | −4 dBm/channel |
| Channel spacing | 50 GHz |

The dotted and solid lines correspond to a ten Gb/s NRZ signal and a forty Gb/s RZ-DQPSK signal, respectively. As can be seen, the Q-penalty of the forty Gb/s RZ-DQPSK signal decreases with decreasing $\beta$ because of bit-walk off that relaxes the XPM-induced phase noise, while the Q-penalty of the ten Gb/s NRZ signal gradually increases with $\beta$ due to the effects of Self Phase Modulation (SPM) and Group Velocity Dispersion (GVD). Furthermore, it should be considered that the required range of dispersion compensation at the receiver (the additional compensation for residual dispersion that may be needed after compensation applied by DCM 30 at a terminal node for forty Gb/s RZ-DQPSK signals) increases as $\beta$ decreases. The residual dispersion (RD) was beyond +1000 ps/nm (which may be undesirable) when $\beta$ is less than approximately 72% dispersion compensation for the simulation parameters given. Based on this scenario, 80% is one example of a target value for β, which has still low Q-penalty for 40 Gb/s signals and provides no additional penalty for 10 Gb/s signals. However, as shown in FIG. 4, a value of β anywhere from approximately 60% to approximately 85% may provide desirable effects when using a low chromatic dispersion fiber to transmit ten Gb/s and forty Gb/s signals together.

The above findings can be applied, as an example, in the network of FIG. 1 by applying 80% dispersion compensation (or any other suitable compensation amount in the range of approximately 60% to approximately 85%) to both the 10 Gb/s and 40 Gb/s signals at each DCM 30 in the network. Such a dispersion compensation scheme may be appropriate when fibers 28 are low chromatic dispersion fibers (as opposed to the overcompensation scheme described above in FIG. 3, which may be appropriate when using high chromatic dispersion fibers).

Figure 5:
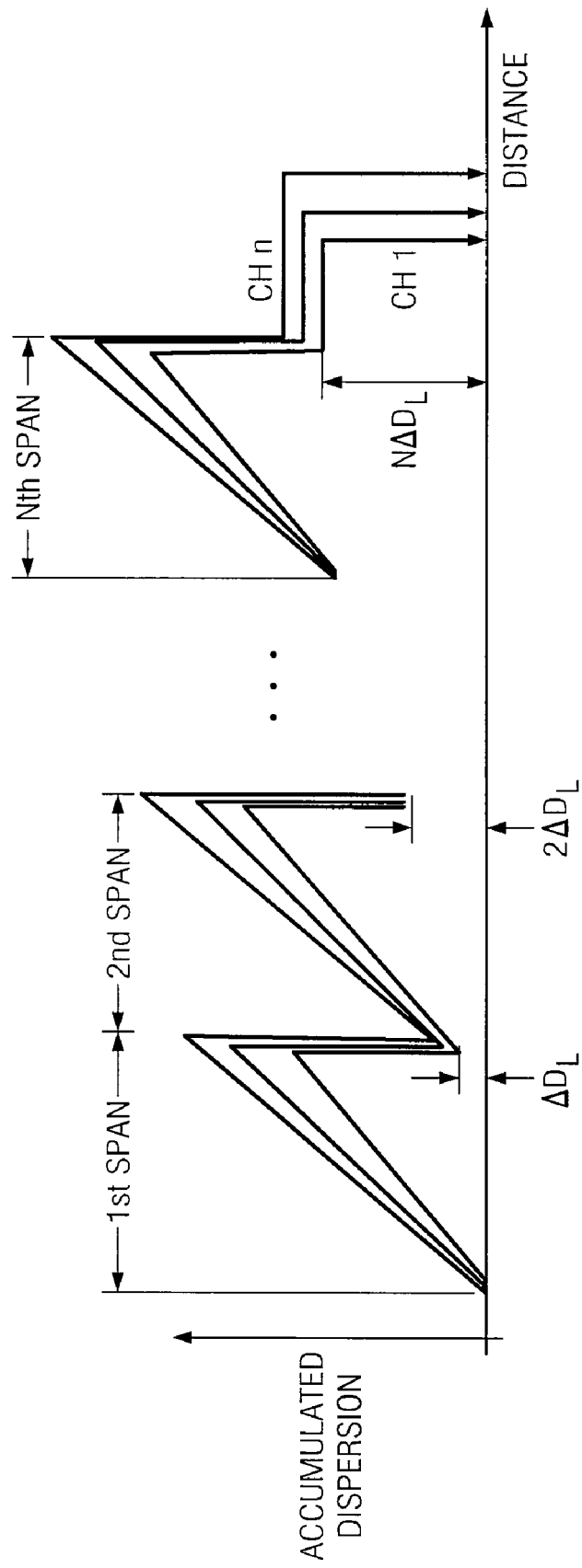
FIG. 5 is a graph illustrating optical dispersion undercompensation for signals in the optical network of FIG. 1.

FIG. 5 is a graph illustrating optical dispersion undercompensation for signals in the optical network of FIG. 1. Specifically, the graph illustrates the optical dispersion overcompensation performed by DCMs 30 of optical network 10. Again, such a scheme may be appropriate when fibers 28 of the network are low chromatic dispersion fibers. The vertical axis represents accumulated optical dispersion. The horizontal axis represents the distance that the optical signal has traveled (the number of optical fiber spans over which the signal has traveled). $\Delta D_L$ refers to the residual optical dispersion that a signal in an example embodiment exhibits after each span for optimum (or near-optimum) performance.

In the illustrated embodiment, each DCM 30 compensates for dispersion in an amount less than the dispersion accumulated over the span of fiber 28 by $\Delta D_L$. Thus, after the first span over which the signal has traveled, DCM 30 will compensate the signal such that accumulated dispersion is equal to $\Delta D_L$. Over N spans, accumulated dispersion is equal to $N(\Delta D_L)$. In particular embodiments, as described above, before being received by receivers 24 of terminal node 12b, the forty Gb/s nPSK signals may be compensated by additional dispersion compensation devices such as, for example, additional TDCs. FIG. 5 illustrates how, in particular embodiments, additional dispersion compensation is applied by these devices on the forty Gb/s nPSK signals such that these signal comprise zero accumulated optical dispersion. The ten Gb/s NRZ signals may not need any additional compensation before being received by receivers 22.

Although the present invention has been described with several embodiments, various changes and modifications may be suggested to one skilled in the art. It is intended that the present invention encompass such changes and modifications as fall within the scope of the appended claims.

What is claimed is:

1. A method for dispersion compensation of an optical signal communicated in an optical network comprising a plurality of spans, the method comprising:
   receiving an optical signal comprising a plurality of channels, wherein the information being communicated in a first set of one or more of the channels is modulated using a first modulation technique and wherein the information being communicated in a second set of one or more of the channels is modulated using a second modulation technique; and
   uniformly undercompensating for optical dispersion in the optical signal across all of the channels of the optical signal such that the accumulated dispersion in the optical signal increases with each span over which the optical signal is communicated, wherein all of the channels of the optical signal are uniformly undercompensated in the range of approximately 60% to approximately 85% dispersion compensation for each span.

2. The method of claim 1, wherein:
   the information being communicated in the first set of channels is communicated at 10 Gb/s; and
   the information being communicated in the second set of channels is communicated at 40 Gb/s.

3. The method of claim 1, wherein:
   the first set of channels use non-return-to-zero modulation; and
   the second set of channels use phase-shift keying modulation.

4. The method of claim 1, wherein all of the channels of the optical signal are uniformly undercompensated at approximately 80% dispersion compensation for each span.

5. The method of claim 1, wherein each of the spans of the optical network comprises low chromatic dispersion fiber.

6. The method of claim 1, further comprising performing additional compensation on the second set of channels in preparation for receipt of the optical signal at a receiver and such that accumulated dispersion in the second set of channels is substantially zero.

7. A system for dispersion compensation of an optical signal communicated in an optical network comprising a plurality of spans, the system comprising:
   one or more transmitters operable to communicate an optical signal comprising a plurality of channels, wherein the information being communicated in a first set of one or more of the channels is modulated using a first modulation technique and wherein the information being communicated in a second set of one or more of the channels is modulated using a second modulation technique;
   a plurality of dispersion compensation devices, each span comprising at least one dispersion compensation device, each dispersion compensation device operable to:
   receive the optical signal; and
   uniformly undercompensate for optical dispersion in the optical signal across all of the channels of the optical signal such that the accumulated dispersion in the optical signal increases with each span over which the optical signal is communicated, wherein all of the channels of the optical signal are uniformly undercompensated in the range of approximately 60% to approximately 85% dispersion compensation for each span.

8. The system of claim 7, wherein:
   the information being communicated in the first set of channels is communicated at 10 Gb/s; and
   the information being communicated in the second set of channels is communicated at 40 Gb/s.

9. The system of claim 7, wherein:
   the first set of channels use non-return-to-zero modulation; and
   the second set of channels use phase-shift keying modulation.

10. The system of claim 7, wherein each dispersion compensation device uniformly undercompensates all of the channels of the optical signal at approximately 80% dispersion compensation.

11. The system of claim 7, wherein each of the spans of the optical network comprises low chromatic dispersion fiber.

12. The system of claim 7, further comprising an additional dispersion compensation device associated with a receiver operable to perform additional compensation on the second set of channels in preparation for receipt of the optical signal at the receiver such that accumulated dispersion in the second set of channels is substantially zero.

13. A method for dispersion compensation of an optical signal communicated in an optical network comprising a plurality of spans each comprising low chromatic dispersion fiber, the method comprising:

receiving an optical signal comprising a plurality of channels, wherein the information being communicated in a first set of one or more of the channels is modulated using a non-return-to-zero modulation technique at a first bit rate and wherein the information being communicated in a second set of one or more of the channels is modulated using a phase-shift keying second modulation technique at a second bit rate that is different than the first bit rate;

uniformly undercompensating for optical dispersion in the optical signal across all of the channels of the optical signal in the range of approximately 60% to approximately 85% dispersion compensation for each span such that the accumulated dispersion in the optical signal increases with each span over which the optical signal is communicated; and performing additional compensation on the second set of channels in preparation for receipt of the optical signal at a receiver and such that accumulated dispersion in the second set of channels is substantially zero, while not performing additional compensation on the first set of channels.

* * * * *